(12) United States Patent
Neiss et al.

(10) Patent No.: US 6,990,401 B2
(45) Date of Patent: Jan. 24, 2006

(54) PREDICTIVE SPEED CONTROL FOR A MOTOR VEHICLE

(75) Inventors: Konstantin Neiss, Stuttgart-Unterturkheim (DE); Stephan Terwen, Esslingen (DE); Thomas Connolly, Portland, OR (US)

(73) Assignee: DaimlerChrysler AG, Stuttgart (DE)

( * ) Notice: Subject to any disclaimer, the term of this patent is extended or adjusted under 35 U.S.C. 154(b) by 340 days.

(21) Appl. No.: 10/264,253

(22) Filed: Oct. 4, 2002

(65) Prior Publication Data

US 2004/0068359 A1    Apr. 8, 2004

(51) Int. Cl.
*G06F 7/00* (2006.01)

(52) U.S. Cl. ........................................ 701/96
(58) Field of Classification Search .............. 701/96, 701/93, 25; 340/435, 436, 439, 438
See application file for complete search history.

(56) References Cited

U.S. PATENT DOCUMENTS

| | | | |
|---|---|---|---|
| 5,713,428 A | 2/1998 | Linden et al. | |
| 5,774,820 A | 6/1998 | Linden et al. | |
| 6,278,931 B1 | 8/2001 | Crawford et al. | |
| 6,370,472 B1 * | 4/2002 | Fosseen ...................... | 701/102 |

| | | |
|---|---|---|
| 2003/0221886 A1 | 12/2003 | Petrie, Jr. |

FOREIGN PATENT DOCUMENTS

EP    1 334 863 A2    2/2003

OTHER PUBLICATIONS

Patent Application entitled "Vehicle Cruise Control System"; Alfred E. Petrie Jr., filed Oct. 23, 2003.

* cited by examiner

*Primary Examiner*—Yonel Beaulieu
(74) *Attorney, Agent, or Firm*—Crowell & Moring LLP

(57) ABSTRACT

A predictive cruise control system utilizes information about the current vehicle position, and upcoming terrain to save fuel and increase driving comfort. A vehicle operating cost function is defined, based on a plurality of environmental parameters, vehicle parameters, vehicle operating parameters and route parameters. As the vehicle travels over a particular route for which route parameters, such as road gradient and curvature, are stored in a road map, sensors aboard the vehicle detect environmental and vehicle operating parameters, including at least vehicle speed and its position relative to the road map. As the vehicle proceeds, an onboard computer iteratively calculates and stores in a memory vehicle control parameters that optimize the vehicle operating cost function for a predetermined prediction horizon along the route ahead of the vehicle. The optimal vehicle control parameters for the Prediction Horizon are then stored, updated and used to control the vehicle.

39 Claims, 11 Drawing Sheets

PREDICTIVE SPEED CONTROL FOR A MOTOR VEHICLE

BACKGROUND AND SUMMARY OF THE INVENTION

The present invention is directed to a cruise control unit for a motor vehicle, which minimizes vehicle operating costs, based on an analysis of vehicle operating parameters and route information regarding a route section ahead of the vehicle.

Conventional cruise control systems seek to maintain vehicle speed at a preset value, which is ordinarily input to the system by an operator of the vehicle. For this purpose, the system includes sensors for detecting actual vehicle speed, which is fed to a controller and compared with the desired vehicle speed. The vehicle throttle is then adjusted based on an error signal and a control algorithm. Such closed loop control systems, which may utilize P, PI, or PID control are well known. In addition, such systems may (but need not) also include sensors for detecting obstacles in the path of the vehicle, and for adjusting the vehicle speed accordingly.

One disadvantage of conventional cruise control systems is that they fail to take into account, environmental parameters regarding the route which is being traveled, such as road gradient and road curvature. Thus, the conventional cruise control system seeks to maintain a vehicle speed at the set value, regardless of whether the vehicle is on an uphill or a downhill grade, or is approaching a sharp curve in the road. However, if a vehicle maintains its speed at a desired value on an uphill grade, then it will pick up speed, possibly exceeding the desired speed on the downhill segment such that the vehicle operator must intervene and apply the vehicle brakes. Similarly, since the cruise control system also maintains vehicle speed when entering a curve, it will frequently be necessary for the vehicle operator once again to intervene by applying the brakes, in order to accommodate the curve. Such wide variations in vehicle speed, as well as the necessity for human intervention in order to apply the vehicle brakes, are wasteful.

Accordingly, it would be advantageous to provide a cruise control system which utilizes information about the current position of the vehicle, as well as stored information concerning upcoming terrain along the route currently being traveled, in order to save fuel and increase driving comfort. In such a system, the current vehicle position may be determined, for example, by means of a Global Positioning System (GPS), and information about the upcoming terrain can be taken from a three-dimensional digital road map for the purpose of controlling vehicle operation.

A system of this generic type is disclosed, for example, in U.S. Pat. No. 6,370,472 B1, in which an optimal set of vehicle control parameters are initially established by having a driver of particularly high skill in the conservation of fuel, drive the vehicle over a predetermined course. As the vehicle proceeds, sensors collect throttle voltage information, as well as time position and elevation data from a GPS receiver. The latter information is stored, together with vehicle speed data in a digital map. Thereafter, when the vehicle once again travels over the same route, an onboard computer uses the previously created optimal driving profile to control the throttle position of the vehicle. For this purpose, the onboard computer uses information read from a GPS sensor to compare the current vehicle position and throttle voltage to the historical data, reads the previously recorded "optimal" data from the digital map, and uses adaptive techniques to match the current throttle voltage to the throttle voltage at the same location based on the historical data established during the optimizing initial run.

For the latter purpose, the '472 system provides for matching the slope of the historical (optimum) run to the current run. That is, the system "looks ahead" a specified distance or time, and determines the slope of the "historical throttle voltage versus time/distance curve", and applies that slope to the current data to adjust the current throttle position.

One disadvantage to the known prior art systems, such as the '472 patent, is that they require at least one "record drive" to be performed prior to operation of the system. This in turn requires that every route in the road network contained within a potential operating area of the vehicle must first be transited by an expert driver. Furthermore, control of the vehicle throttle based on such historical driver generated information is only as good as the "expert driver" who first traveled the route, establishing the historical profile to control throttle position. To the extent that such driver deviates from the actual optimum operating parameters during the initial "record drive" subsequent vehicles traveling the same route will deviate from the optimum in a corresponding manner.

In addition, unforeseeable driving situations which occurred during driving with automatic throttle control are not considered in the recorded historical throttle profile. Such a situation might arise, for example, where the driver manually overrules the cruise control system (for example, by applying the vehicle brakes) when the vehicle approaches a slower vehicle ahead, or when the cruise control is overruled by another driving system, such as an adaptive cruise control system with distance control. In such situations, it is necessary to adjust the subsequent driving parameters according to a profile which differs from an historical profile in order yet to achieve optimum vehicle operation. However, the prior art systems, such as the '472 patent contain no provision for reconfiguring the system to return to the record/preselected throttle control profile, since the recorded control values are not modified, and do not themselves adapt to changing driving situations in this manner.

Accordingly, one purpose of the present invention is to provide a vehicle control system which continually adjusts vehicle control parameters to optimum values based on current vehicle operating conditions as well as stored route information, using an analytic function to determine an optimal velocity of the vehicle.

Another object of the invention is to provide a vehicle control system which exhibits a high degree of flexibility, and is able to adapt the velocity control to changing driving situations which result from the intervention of external constraints on driving behavior as the vehicle transits a particular route.

Still another object of the invention is to provide such a system which eliminates the need for an initial "record drive" by an expert, as well as the human error introduced into the system as a result of failure by the expert to achieve optimal driving conditions during the record drive.

Yet another object of the invention is to provide a vehicle control system in which optimal vehicle control values are continuously calculated online during operation of the vehicle, taking into account the current vehicle velocity as it transits a particular route.

Finally, another object of the present invention is to provide a vehicle control system which takes into account road curvature information, to adjust the vehicle throttle position.

These and other objects and advantages are achieved by the predictive cruise control system according to the invention, which utilizes information about the current vehicle position, as well as upcoming terrain in order to save fuel and increase driving comfort. The current position is determined by means of a signal received from a Global Positioning System (GPS), and possibly by integration of the vehicle speed over the course of the journey, and information about the upcoming terrain is taken from a three dimensional digital map. The vehicle velocity is then controlled in order to follow an analytically computed optimal driving strategy, based on this information. No previous "record" drive is therefore required.

In the predictive cruise control system according to the invention, a vehicle operating cost function is defined, based on a plurality of environmental parameters, vehicle parameters, vehicle operating parameters and route parameters. As the vehicle travels over a particular route for which route parameters, such as road gradient and curvature, are stored in a road map, sensors aboard the vehicle detect environmental and vehicle operating parameters, including at least vehicle speed and position relative to the road map. As the vehicle proceeds, an onboard computer iteratively calculates and stores in a memory vehicle control parameters that optimize the vehicle operating cost function for a predetermined distance (referred to as a "Prediction Horizon") along the route ahead of the vehicle. The optimal vehicle control parameters for the Prediction Horizon are then stored in a memory and continuously updated and replaced by new data as the vehicle (and hence the Prediction Horizon) moves along, thereby adjusting the "optimal" control parameters to reflect actual vehicle historical operating experience during the journey. The vehicle is then controlled by reading the optimized vehicle control parameters from the memory, corresponding to the current position of the vehicle.

Other objects, advantages and novel features of the present invention will become apparent from the following detailed description of the invention when considered in conjunction with the accompanying drawings.

DETAILED DESCRIPTION OF THE INVENTION

Figure 1:
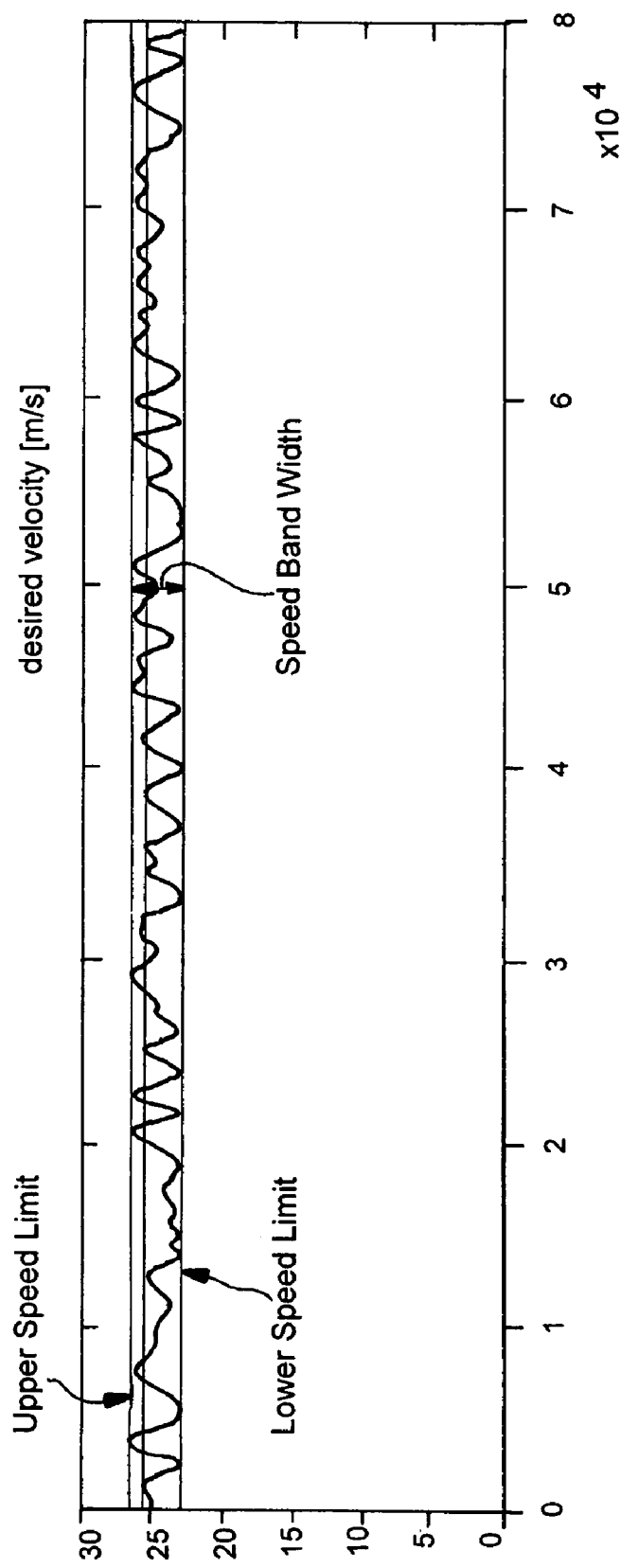
FIG. 1 is a graphic illustration of the operation of the Predictive Cruise Control System according to the invention, maintaining vehicle speed within a permitted range.
Figure 2:
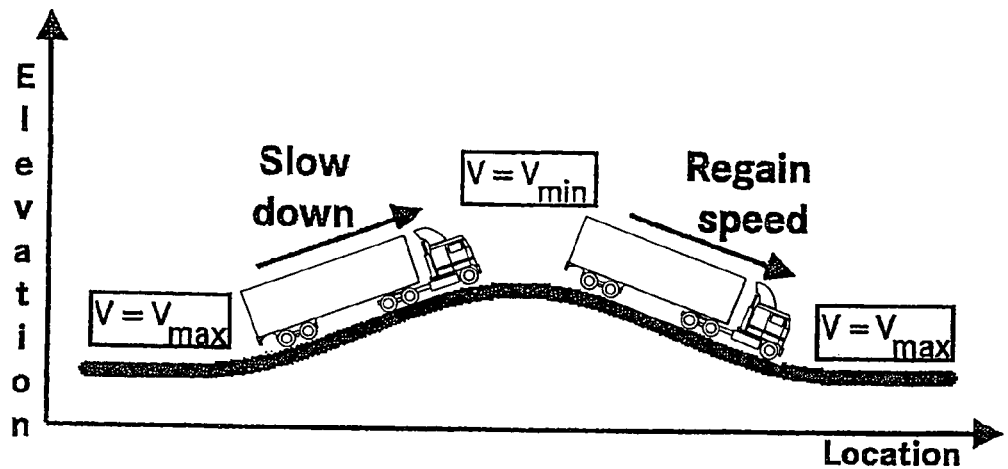
FIG. 2 is a graphic depiction of a vehicle transiting a hill.

The basic idea of Predictive Cruise Control (PCC) is to replace or supplement the set speed of a conventional cruise control with a speed band. Forward-looking terrain information is used to determine, as a function of position, a desired speed inside the speed band (as shown in FIG. 1 for example), in order to maximize fuel savings. In the ideal case, the vehicle that is equipped with PCC slows down as it moves uphill until it reaches a minimum speed on top of the hill, and regains speed on the downhill part, thus completely converting the potential energy into kinetic energy. (See FIG. 2.) This strategy prevents unnecessary braking, or delays braking until it is unavoidable.

Figure 3:
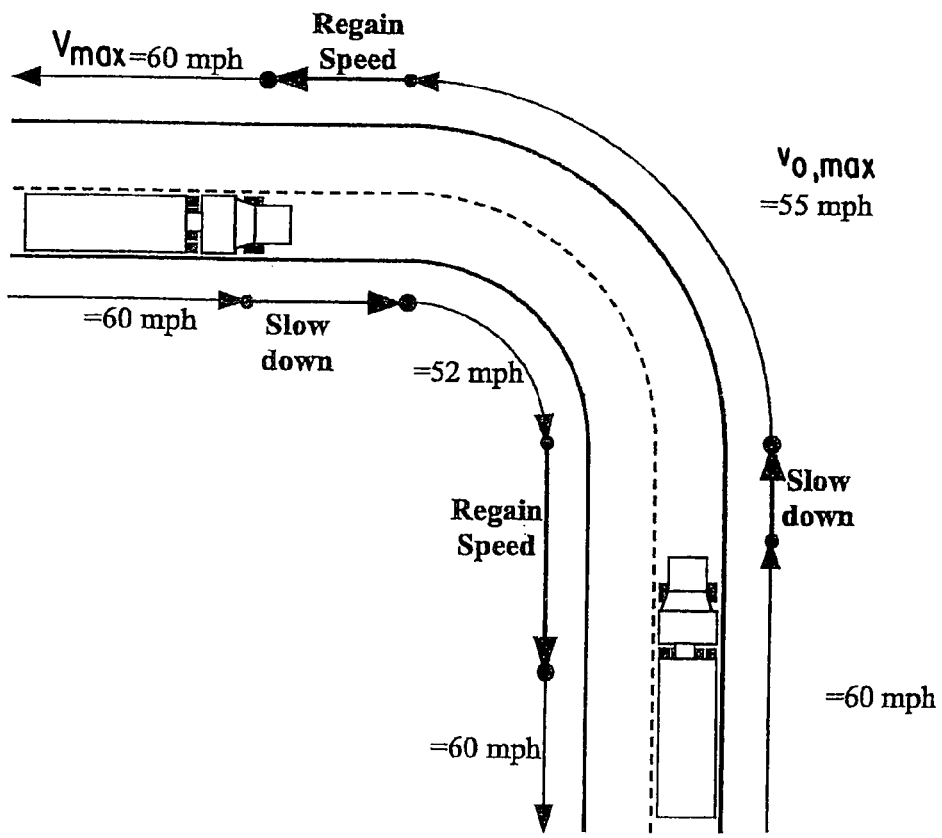
FIG. 3 is a graphic depiction of vehicles traveling in a curve.

In addition, road curvature information can also be used to reduce vehicle speed in curves in order to avoid high lateral acceleration which can lead to vehicle rollover. As the vehicle approaches a curve, the speed can automatically be reduced as shown in FIG. 3.

The PCC System

Figure 4:
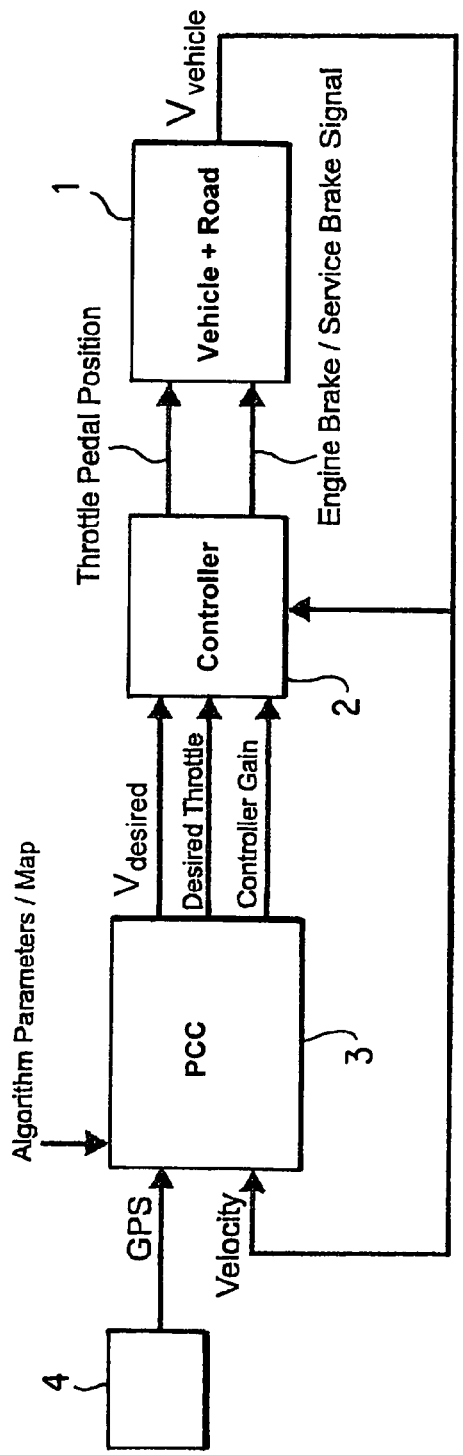
FIG. 4 shows the structure of the overall PCC system according to the invention.

A block diagram of the PCC vehicle control system according to the invention is shown in FIG. 4. It includes a conventional controller 2, which may (but need not) be a closed loop cruise control system in which the throttle of the vehicle 1 is controlled based on an error signal between actual and desired vehicle speed. Such systems are well known, as discussed below in regard to FIG. 5. In addition, the system according to the invention also includes a PCC block 3, which receives the following inputs:

GPS: The Global Positioning System 4 supplies the PCC block 3 with information about the current position of the vehicle.

Current Velocity: The vehicle velocity is used to estimate the current vehicle position if no GPS signal is available, and is also used to update the desired vehicle speed.

In turn, the PCC block generates as outputs:

Desired Velocity $v_{desired}$

Desired Throttle: The Throttle Pedal Position controls the fuel injection to the motor. This output may take on negative values if the PCC system requests a deceleration of the vehicle.

Controller Gain: If a linear controller is utilized to allow the vehicle to follow the optimal velocity trajectories this PCC output supplies the appropriate optimal gain value.

All these output signals are inputs for the controller 2 which controls the vehicle to follow the calculated velocity trajectory.

It should be noted in this regard that there are many ways in which the desired vehicle velocity can be realized by the controller, but they are all fundamentally the same. Eventually a command signal must be given to the engine so that it attempts to achieve the desired speed. This command is referred to herein as the "throttle position". In reality, the command need not be a true throttle position. In its most general sense the process is: the desired vehicle speed is converted to a desired engine speed, which is sent to the engine and the engine achieves it via its own controller or using a separate adaptive cruise controller. In the case of a diesel engine, the engine determines how much fuel to inject. (The amount of fuel injected can be mapped to a pedal or throttle position, which is why it is referred to in this way.) On the other hand, if the system is implemented with a gasoline engine, the command could actually be a throttle angle.

Figure 5:
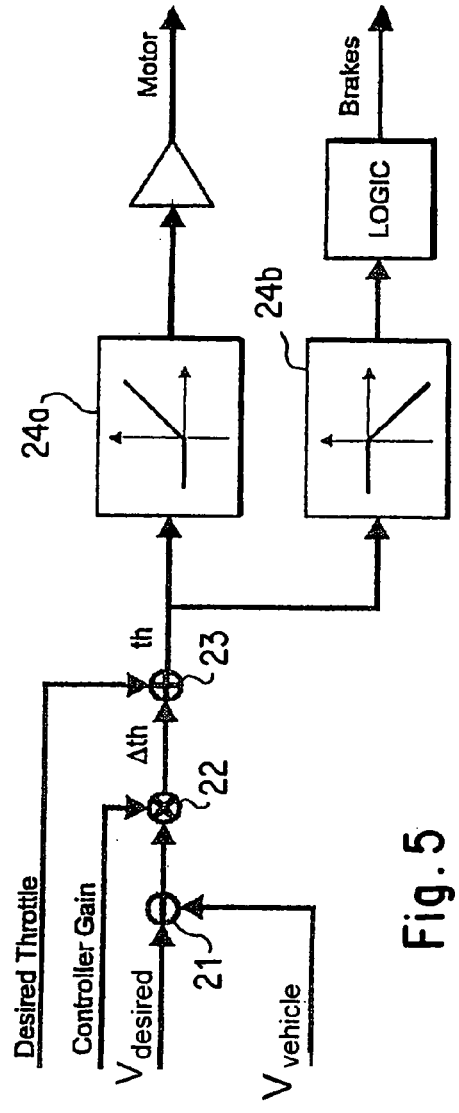
FIG. 5 is a block diagram which shows the linear controller in FIG. 4.

FIG. 5 shows a linear controller of a type which may be included in the system of FIG. 4. In the subtraction unit 21, the actual vehicle speed $v_{act}$ is compared with the desired speed $v_{des}$, and multiplied by the input controller gain in a multiplier unit 22, to generate a throttle error signal Δth. The latter is then added to a desired throttle input in an adder 23 to generate a throttle signal th, that is applied to vehicle throttle and braking characteristics 24a,b, which are used to control the vehicle throttle and brakes.

In practice, the functionality of the linear controller represented by block 2 in FIG. 4 may already be present in the vehicle so that a set speed determined in the PCC block 3 is provided to the vehicle, which applies it using its own control algorithms implemented by its own engine controller.

Figure 6:
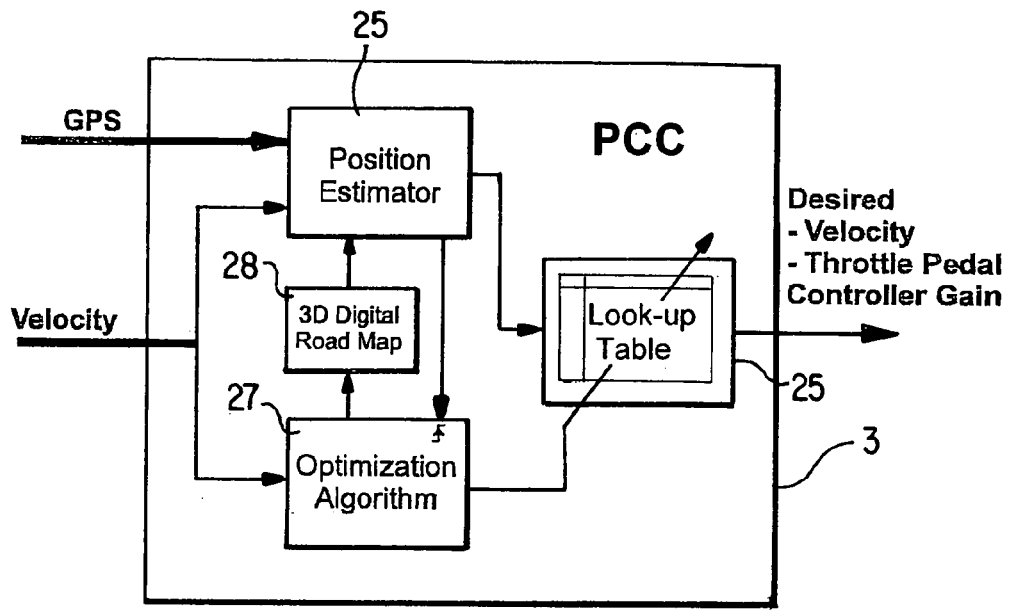
FIG. 6 is a block diagram which shows the structure of the Predictive Cruise Control module in the system according to the invention.

The basic structure of the PCC block is shown in FIG. 6. it includes four basic modules:

Position Estimator 25: This module (which may be present in the vehicle navigation system) determines the current position of the vehicle on the road by integrating the vehicle velocity and taking into account the incoming GPS messages.

Look-up Table 26: The look-up table is a memory where desired velocity, throttle pedal, and controller gain values are stored for an area (the Prediction Horizon) around the current vehicle position. The outputs of the PCC block are determined by reading out the values belonging to the vehicle position supplied by the Position Estimator.

Optimization Algorithm Module 27: This is the main module, in which optimal velocity trajectory, the optimal throttle pedal positions, and the controller gains are calculated for the approaching road within the Prediction Horizon, based on optimization of a cost function, as described hereinafter. These series are then stored in the look-up table. The start of a new calculation is triggered every time the vehicle has covered a specified distance. It may also be triggered by other events, such as the vehicle driver's changing the set vehicle speed.

3D Digital Road Map 28: The Optimization Algorithm (described hereinafter) uses information read from the digital map to determine the gradient angles and curve radii of the upcoming road; and the Position Estimator module uses information about the area surrounding the current position to determine the most likely position on the road for a new GPS message to initialize its integrator.

The Vehicle+Road Model

In order to optimize operation of the vehicle in an adaptable analytical manner based on actual current vehicle operation as the journey progresses, a mathematical model of a vehicle driving on the road is needed. This model can be derived from Newton's third law $$m \cdot \frac{d}{dt} v = \sum_i F_i, \quad \text{(Eq. 1)}$$

wherein $F_i$ are the external and internal forces affecting the vehicle.

Figure 7:
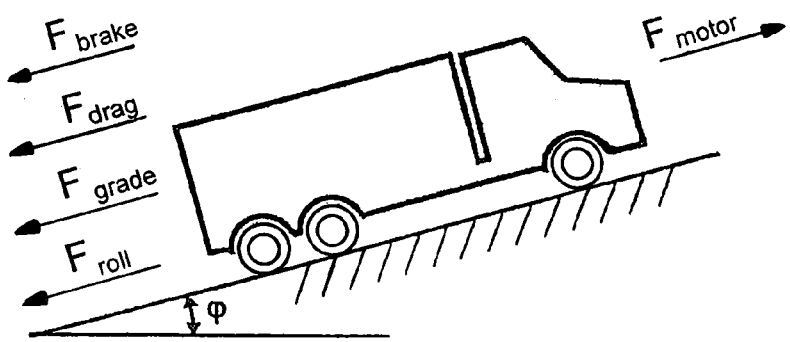
FIG. 7 is a graphic illustration of the forces which act on a vehicle traveling on an incline.

FIG. 7 shows a vehicle operated on an incline, as well as the forces that act on it. These forces include:

$F_{roll} = -\mu g \cos \phi$—the grade of the street. $\mu$—friction coefficient of the street, g—gravitation constant, $\phi$—the grade of the street measured in radiant)

$F_{grade}$-g sin $\phi$: The force caused by the gravity.

$$F_{drag} = -\frac{1}{2} C_w \rho_{air} A v^2:$$

The turbulent friction. ($c_w$—the characteristic shape coefficient, $\rho_{air}$—the density of the air, A—the surface area of the vehicle, v—velocity)

$F_{motor}$: The force caused by the engine.

$F_{brake}$: The decelerating force by the brake.

Combining these forces, the equation of motion then becomes:

$$m \frac{dv}{dt} = F_{motor} + F_{brake} + F_{drag} + F_{grade} + F_{roll} \quad \text{(Eq. 2)}$$

In the system equation there is no extra brake force considered. This is done since the partial derivatives of the system equation are presumed to exist. In order to take the decelerating effect of the brakes in account, the throttle pedal is allowed to assume negative positions, and so the motor is capable of generating a decelerating torque. These negative throttle values are converted to respective brake signals by a controller following the PCC system.

The accelerating or decelerating force caused by the motor is calculated by Eq. 3 from the engine torque.

$$F_{motor} = \eta \frac{i_D i_T}{r_w} T_{motor} \quad \text{(Eq. 3)}$$

where
  $\eta$ is the effectiveness of the drive train.
  $i_T$ is the transmission coefficient.
  $i_D$ is the axle transmission coefficient.
  $r_w$ is the radius of the wheels.
  $T_{motor}$ is the applied torque by the engine.

The engine torque is composed of the decelerating or accelerating torque $T_{use}$ and the engine friction torque $T_{friction}$.

$$T_{motor} = T_{use} - T_{friction} \quad \text{(Eq. 4)}$$

Figure 8:
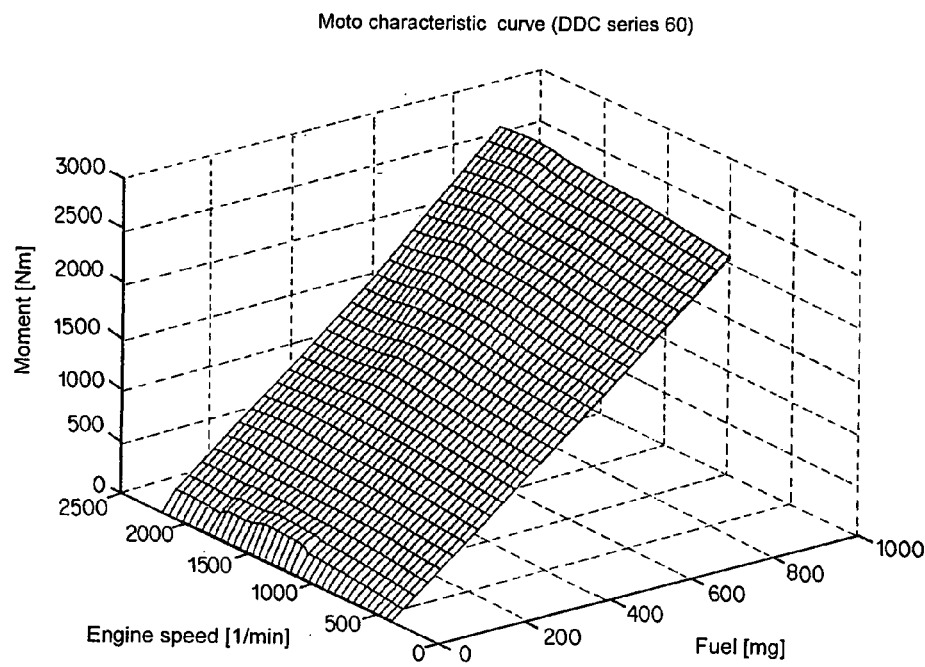
FIG. 8 is a graphic depiction of a look-up table defining the relationship between engine speed, fuel consumption and engine output torque.

$T_{use}$ is determined by the motor look-up table, such as in FIG. 8, which shows engine torque in relation to engine speed n and fuel consumption per engine revolution measured in mg. The relation between the throttle pedal position th and the fuel value is assumed to be static and linear. That is, $$\text{fuel} = \text{fuel}_{max} \cdot th \quad \text{(Eq. 5)}$$

where th≦1 and $\text{fuel}_{max}$ is the maximum value of 'fuel' in the look-up table. As can be seen in FIG. 8, the look-up table can be approximated by a plane, as follows:

$$T_{use} = K_1 \cdot \text{fuel} + K_2 \cdot n + K_3. \quad \text{(Eq. 6)}$$

Figure 9:
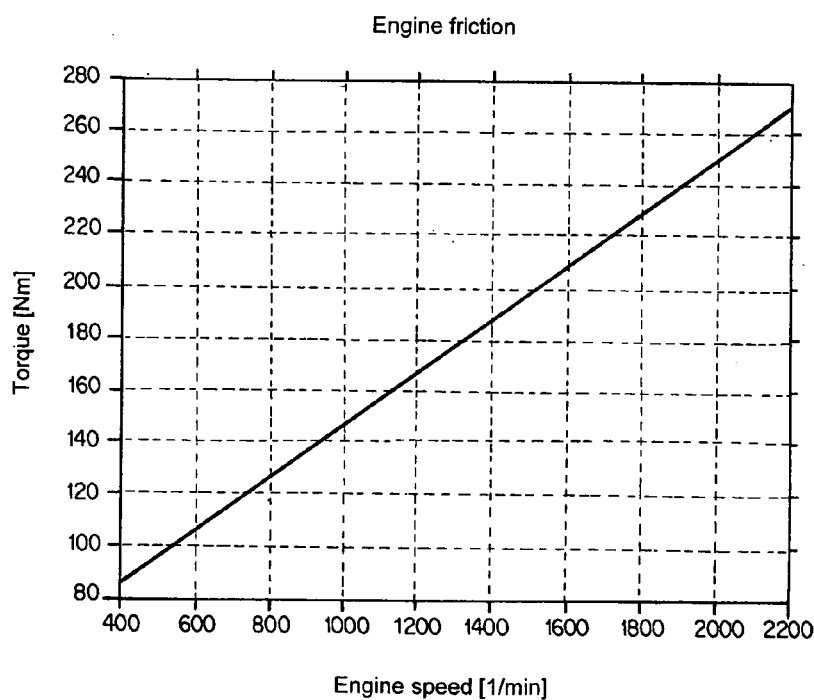
FIG. 9 is a graphic depiction of the relationship between engine speed and engine friction.

Also the characteristic curve of the engine friction is approximated by a straight line, as shown in FIG. 9. That is, the relationship between friction torque and engine speed is given by:

$$T_{friction} = R_1 \cdot n + R_2. \quad \text{(Eq. 7)}$$

And finally, the relation for the engine speed is:

$$n = 30 \frac{i_D i_T}{r_w \pi} v \quad \text{(Eq. 8)}$$

Combining Equations 4–8 yields the following expression for motor torque:

$$T_{motor} = K_1 \, fuel_{max} \, th + \frac{30 i_D i_T}{r_w \pi}(K_2 - R_1)v + K_3 - R_2. \quad \text{(Eq. 9)}$$

And combining all of the preceding results together in the motion equation (Eq. 1):

$$m \frac{d}{dt} v(t) = \frac{30 \eta \, i_D^2 i_T^2 (K_2 - R_1)}{r_w^2 \pi} v + \frac{\eta \, i_D i_T (K_1 fuel_{max} th + K_3 - R_2)}{r_w} - \quad \text{(Eq. 10)}$$
$$1/2 c_w \rho A v^2 - m \mu g \cos(\phi) - mg \sin(\phi).$$

It is convenient to change Eq. 10 such that it is differentiated with respect to distance rather than time. This is achieved with the substitution:

$$dt = \frac{1}{v} ds, \quad \text{(Eq. 11)}$$

where s is the driven distance from a specified start point on the current street. Applying Eq. 11 to Eq. 10:

$$\frac{d}{ds} v(s) = \underbrace{\frac{c_w \rho A}{2m}}_{=:A_1} \cdot v(s) + \quad \text{(Eq. 12)}$$
$$\underbrace{\frac{30 \eta \, i_T^2 i_D^2 (K_2 - R_1)}{m r_w^2 \pi}}_{=:A_2} +$$
$$\underbrace{\frac{\eta \, i_T i_D (K_3 - R_2) - r_w mg(\mu \cos\varphi(s) + \sin\varphi(s))}{m r_w}}_{=:A_3(s)} \cdot$$
$$\frac{1}{v} + \underbrace{\frac{\eta \, i_T i_D fuel_{max} K_1}{m r_w}}_{=:B} \cdot \frac{th}{v}$$

With the position independent coefficients $A_1$, $A_2$ B and the position dependent coefficient $A_3$ (S), the system equation becomes $$\frac{d}{ds} v(s) = A_1 v + A_2 + A_3(s) \frac{1}{v} + \frac{B}{v} th \quad \text{(Eq. 13)}$$
$$= f(s, v(s), th(s)).$$

In practice application, a discrete model is needed. This is obtained by Euler approximation, $$v(s_{k+1}) = v(s_k) + \int_{s_k}^{s_{k+1}} f(s, v(s), th(s)) \quad \text{(Eq. 14)}$$
$$\approx v(s_k) + \underbrace{(s_{k+1} - s_k)}_{=:h} \cdot f(s_k, v(s_k), th(s_k))$$
$$v(s_{k+1}) = v(s_k) + h \cdot f(s_k, v(s_k), th(s_k)).$$

where the constant h is called the Integration Step Size.

The Cost Function

If a system is to be controlled in an 'optimal' manner, it is first necessary to define what optimal means. Usually in optimal control theory a "cost" function is defined. A system is later called optimal if the calculated control sequence minimizes the cost function. The cost function should be chosen in order to let the system behave in a desired way. Accordingly, for the purpose of the Predictive Cruise Control according to the invention, the following goals were established to define "optimal operation":

The vehicle should consume less fuel and should activate the brakes as little as possible.

The vehicle should attempt to maintain a specified velocity (Set Speed).

The vehicle's velocity should neither exceed an upper limit nor undershoot a lower velocity limit.

The total travel time should be minimized.

The lateral acceleration while driving in curves should not be so high as to impair driving comfort and safety.

It should be possible to stress the different aspects mentioned above individually.

These demands are expressed in an analytic cost function, together with the further requirements that the mathematical expression for the cost function should be:

Differentiable to calculate a "stationary" point at which its slope is zero (min/max point); and Easy for a computer to process.

Hereinafter, discrete expressions for the individual demands are derived.

Fuel and Braking

As mentioned previously, the brakes are considered by allowing 'negative' throttle pedal positions. So it is necessary to take negative throttle values th into consideration in deriving a characteristic expression for the fuel consumption and the brake activity. The fuel consumption per second can be calculated by $$Q(t) = \underbrace{\frac{fuel_{max} i_D i_T}{2 \cdot 10^6 \pi r_w \rho_{fuel}}}_{=:\sqrt{\psi}} \cdot v(t) \cdot th(t) \quad \text{(Eq. 15)}$$

where $\rho_{fuel}$ is the density of the fuel $$\left( \text{measured in } \frac{kg}{m^3} \right).$$

Since negative values for the throttle pedal position also occur, one possible expression for the cost function is $$J_{fuel} = \frac{1}{2}\int_0^t SQ^2 dt, \quad \text{(Eq. 16)}$$

where S is a constant weighting factor. Substituting Equations 11 and 15 into Equation 16 yields:

$$J_{fuel} = \frac{1}{2}\int_0^t S\psi v th^2 ds, \quad \text{(Eq. 17)}$$

For discrete computations, the integral must be replaced by a summation, which can be achieved by the Euler approximation.

$$J_{fuel} = \frac{1}{2} \cdot h \cdot \sum_{k=0}^{N-1} S\psi v_k th_k^2, \quad \text{(Eq. 18)}$$

where N is the number of base points in the considered prediction horizon and $h = S_{k+1} - S_k$ is the Integration Step Size.

Set Speed

To reduce drifts from the desired Set Speed, $v_{desired}$, an term for the cost function is $$J_{velocity} = \frac{1}{2}\int_{x_0}^{x} q(v - v_{desired})^2 ds \quad \text{(Eq. 19)}$$

where q is also a constant factor which determines the weight of the collective cost function. Again, adapting this or discrete computation yields:

$$J_{velocity} = \frac{1}{2} \cdot h \cdot \sum_{k=0}^{N-1} q(v - v_{desired})^2 \quad \text{(Eq. 20)}$$

Lower Velocity Limit

Since the objective is to keep the velocity within certain limits, a cost function term is defined to penalize exceeding Equation 21 shows such a penalty function:

$$J_{penalty} = \frac{1}{2} \cdot \sum_{k=0}^{N-1} (\Gamma_1(v_{lower} - v)^2 \sigma(v_{lower} - v) + \Gamma_2(v - v_{upper})^2 \sigma(v - v_{upper})) \quad \text{(Eq. 21)}$$

Here $\Gamma_{1/2}$ are constant weighting factors. These values ge in respect to the other weighting factors to make the velocity remain between the lower velocity limit, $v_{lower}$, and the upper velocity limit $V_{upper}$. $\sigma(\xi)$ is defined as $$\sigma(\xi) = \begin{cases} 1 & \xi \geq 0 \\ 0 & \xi < 0 \end{cases} \quad \text{(Eq. 22)}$$

Travel Time

The total travel time is calculated by $$T_{total} = \int_0^t dt \quad \text{(Eq. 23)}$$

By changing the total differential, and applying the Euler approximation this can be expressed as $$T_{total} = \int_{x_0}^{x} \frac{1}{v} dx \quad \text{(Eq. 24)}$$

$$\approx \sum_{k=0}^{N-1} \frac{h}{v}$$

Thus, a term considering the total travel time in the cost function is $$J_{time} = \sum_{k=0}^{N-1} \frac{hT}{v} \quad \text{(Eq. 25)}$$

where T is the weighting factor.

Lateral Acceleration

To maintain comfort and safety while driving through a the lateral acceleration of the vehicle should remain predetermined value which is considered safe. The steady state lateral acceleration of the vehicle in the plane of the road can be approximated by:

$$\alpha_{lateral} = v^2 \cdot c(s) - g \sin \Theta(s)$$

For small values of $\Theta$, $\sin \Theta \approx \Theta$. Therefore, this expression may simplified as follows:

$$\alpha_{lateral} = v^2 \cdot c(s) - g \cdot \Theta(s) \quad \text{(Eq. 26)}$$

where
  c is the curvature of the road (inverse of the radius) at distance s along the road;
  g is the acceleration due to gravity; and
  θ is the cross-slope or superelevation of the road at distance s along the road A cost function which attempts to keep the lateral acceleration maximum value is:

$$J_{lateral\_accel} = \frac{1}{2} \cdot h \cdot R \cdot \sum_{k=0}^{N-1} (v_k^2 \cdot c_k - g \cdot \Theta_k - a_{max})^2 \cdot \sigma(v_k^2 \cdot c_k - g \cdot \Theta_k - a_{max}) \quad \text{(Eq. 27)}$$

where:
  R is a constant weighting factor;
  σ is defined in Eq. 22; and
  $a_{max}$ is the predefined maximum acceptable lateral acceleration.

Final State Cost Function

If the final state is not fixed, an additional cost function must be defined for it.

$$\Phi = \frac{1}{2}M(v_N - v_{desired})^2 \quad \text{(Eq. 28)}$$

M is again a constant weighting factor. It should not be chosen so small that numerical difficulties are encountered in further calculations.

The Discrete Cost Function

The cost function is formed by combining the preceding results in a manner which depends on the response which it is desired to control. For example, a system which takes all of the above factors into account would be defined by the equation:

$$J = \Phi + J_{time} + J_{fuel} + J_{velocity} + J_{lateral\_accel} + J_{penalty}$$

Using this formulation results in the following expression for the cost function J, which is used in the minimization analysis hereinbelow:

$$J = \frac{1}{2}M(v_N - v_{desired})^2 + \quad \text{(Eq. 29)}$$

$$\sum_{k=0}^{N-1} \left\{ hT\frac{1}{v_k} + \frac{1}{2}hS\phi v_k th_k^2 + \frac{1}{2}qh(v_k - v_{desired})^2 + \right.$$

$$\frac{1}{2} \cdot h \cdot R \cdot \sum_{k=0}^{N-1} (v_k^2 \cdot c_k - g \cdot \Theta_k - a_{max})^2 \cdot \sigma(v_k^2 \cdot c_k - g \cdot \Theta_k - a_{max}) +$$

$$\left. \frac{1}{2}\Gamma_1(v_{lower} - v_k)^2 \sigma(v_{lower} - v_k) + \Gamma_2(v_k - v_{upper})^2 \sigma(v_k - v_{upper}) \right\}$$

$$=:L$$

On the other hand, it is also possible, within the scope of the invention, to control the system response in other ways simply by zeroing out (that is, applying a zero coefficient to) some of the terms. For example, for predictive cruise control focusing on fuel savings due to elevation changes (without taking into account lateral acceleration), the cost function is given by:

$$J = \Phi + J_{time} + +J_{fuel} + J_{velocity} + J_{penalty}.$$

On the other hand, the cost function implemented for focusing on rollover prevention is:

$$J = \Phi + J_{fuel} + J_{velocity} + J_{lateral\_accel}$$

with each of the above terms being given by the expressions drived previously.

Minimization of the Cost Function

Considering both the cost function J, and the vehicle model of Equation 14, in order to minimize vehicle operating "costs" (as defined), it is necessary to calculate a sequence of control values $th_k(k=0 \ldots N-1)$ so that the cost function:

$$J = \Phi(v_N) + \sum_{k=0}^{N-1} L(s_k, v(s_k), th(s_k)) \to \min \quad \text{(Eq. 30)}$$

while keeping the equality constraints $$v(s_{k+1}) = f(s_k, v(s_k), th(s_k)) \quad \text{(Eq. 31)}$$

and $$v(s_0) = v_0 (\text{initial velocity}) \quad \text{(Eq. 32)}$$

For the purpose of the analysis which follows, $v_k = v(x_k)$, $th_k = th(x_k)$ and $\phi_k$ is just set to $\phi$.

Optimization problems with equality constraints are frequently solved by means of the Lagrangian multiplier, which may be understood as follows: Assume a function h(x,y), where x and y are constrained by g(x,y)=0. Adding g multiplied by a scalar factor $\lambda$ to h yields a new function $L(x,y,\lambda) = f(x,y) + \lambda g(x,y)$. L and h have the same minimum value since this is not changed by adding zero. (g(x,y)=0.) So a stationary point (slope=0) of L is also a stationary point of h, and the constraints are kept since $$\frac{\partial L}{\partial \lambda} = g(x, y) = 0.$$

Defining for every equality constraint a Lagrangian multiplier, and adding it to the cost function J results in the following expression:

$$J = \Phi(v_N) + \sum_{k=0}^{N-1} (L(x_k, v(x_k), th(x_k)) + \quad \text{(Eq. 33)}$$

$$\lambda_{k+1}\{f(x_k, v_x, th_k) - v_{k+1}\})$$

It is useful to define a scalar sequence $H_k$:

$$H_k(x_k, v_k, th_k, \lambda_{k+1}) = L(x_k, v_k, th_k) + \lambda_{k+1} f(x_k, v_k, th_k) \quad \text{(Eq. 34)}$$

Changing indices of summation on the last term in Eq. 33, $$J = \Phi(v_N) - \lambda_N v_N + \sum_{k=1}^{N-1} (H_k - \lambda_k v_k) + H_0 \quad \text{(Eq. 35)}$$

In order to obtain a stationary point the first derivative $\delta J$ of the cost function must be equal to zero.

$$\delta J = \sum_{k=0}^{N-1} \frac{\partial J}{\partial v_k} \delta v_k + \sum_{k=0}^{N-1} \frac{\partial J}{\partial th_k} \delta th_k + \sum_{k=0}^{N-1} \frac{\partial J}{\partial \lambda_{k+1}} \delta \lambda_{k+1} \quad \text{(Eq. 36)}$$

$$= 0$$

After calculating the partial derivatives we get $$\delta J = \left[\frac{\partial \Phi}{\partial v_N} - \lambda_N\right] \delta v_N + \sum_{k=1}^{N-1} \left\{ \left[\frac{\partial H_k}{\partial v_k} - \lambda_k\right] \delta v_k + \quad \text{(Eq. 37)} \right.$$

$$\left. \frac{\partial H_k}{\partial th_k} \delta th_k \right\} + \frac{\partial H_0}{\partial v_0} \delta v_0 + \frac{\partial H_0}{\partial th_0} \delta th_0 +$$

$$\sum_{k=0}^{N-1} \left[\frac{\partial H_k}{\partial \lambda_{k+1}} - x_{k+1}\right] \delta \lambda_{k+1}$$

Since the initial velocity is determined by Eq. 32, the derivative $\delta v_0$ vanishes. The derivative $\delta J$ vanishes for all possible variations in the state variable, $\delta v_k$ in the control variable $\delta th_k$, and in the Lagrangian multiplier $\delta \lambda_{k+1}$ if:

1. $\lambda_k = \dfrac{\partial H_k}{\partial v_k}, k = 0 \ldots N-1$ (Eq. 38)

2. $v(k+1) = \dfrac{\partial H_k}{\partial \lambda_{k+1}}, k = 0 \ldots N-1$ (Eq. 39)

3. $\dfrac{\partial H_k}{\partial th_k} = 0, k = 0 \ldots N-1$ (Eq. 40)

4. $\lambda_N = \dfrac{\partial \Phi(N)}{\partial v_N}$ (Eq. 41)

5. $v(x_0) = v_0$ (Eq. 42)

Such problems are called two-point boundary-value problems. Since this kind of problem can't usually be solved analytically, it is necessary to apply numerical methods. For this purpose, a second-order gradient algorithm was chosen. The advantages of this algorithm are:

The results of every iteration step are improving.

The algorithm converges faster than other numerical algorithms applied on this issue.

Interim results are also stable trajectories.

No adaptation factor need be chosen before starting the algorithm (which otherwise would produce convergence difficulties when applying first order gradient methods, for example).

The optimal position variant controller gain comes as a by-product of this algorithm.

The algorithm which is implemented can be described as follows:

1. Estimate a sequence of control values $th_k$ and solve the systems equation $v_{k+1} = f(s_k, v_k, th_k), v(x_0) = v_0, k = 0, \ldots, N-1.$ (Eq. 43)

In this case, the sequence of control values is determined by controlling the system equation (Eq. 43) with a position variant controller:

$\hat{th}_k = \dfrac{v_{desired}}{B}\left(-A_1 v_{desired} - A_2 - \dfrac{A_3(s_k)}{v_{desired}}\right)$ (Eq. 44)

$th_k = \hat{th}_k - G \cdot (v_k - v_{desired})$ where $A_1, A_2, A_3$, and B are determined by Eq. 12 and G is the controller gain factor. While forward calculating of Eq. 43 together with Eq. 44, the values of $V_k$ and $th_k$ must be recorded.

2. Next, determine the appropriate Lagrangian multipliers by backward calculation of Eq. 38 and Eq. 41. Since the sequences of $v_k$ and $th_k$ are usually not optimal, Eq. 40 is not fulfilled; therefore, the values of $H_{th}^k = \dfrac{\partial H}{\partial th_k}$ (Eq. 45)

must be recorded for further computations.

3. Now, solve the so called influence equations backward:

$P(k) = Z_{vv}(k) - Z_{vth}(k)Z_{thth}^{-1}(k)Z_{thv}(k), P(N) = \dfrac{\partial^2 \Phi}{\partial v_N^2}$ (Eq. 46)

$\xi(k) = f_v^k \xi(k+1) - Z_{vth}(k)Z_{thth}^{-1}(k)(f_{th}^k \xi(k+1) - \Delta H_{th}^k),$ $\xi(N) = 0$ where $f_v^k = \dfrac{\partial f(s_k, v_k, th_k)}{\partial v_k}, H_{vth}^k = \dfrac{\partial^2 H^k}{\partial v_k \partial th_k}, \text{etc}.$ (Eq. 47)

and $Z_{thth}(k) = H_{thth}^k + P(K+1)(f_{th}^k)^2$ (Eq. 48)

$Z_{thv}(k) = Z_{vth}(k) = H_{thv}^k + f_{th}^k P(k+1) f_v^k$ $Z_{vv}(k) = H_{vv}^k + f_v^k P(k+1) f_v^k.$ $\Delta H_{th}^k$ is chosen as $\Delta H_{th}^k = - \in H_{th}^k$ (Eq. 49)

where $0 < \epsilon \leq 1$ is continuously increased every iteration step up to 1 in the last iteration. This choice represents the influence of the first order gradient since $-H_{th}^k$ is in the direction of steepest descent of the cost function.

4. Adapt the sequence of control values $th_k$ by $(th_k)_{new} = (th_k)_{old} + \Delta th_k$ (Eq. 50)

where $\Delta th_k = -Z_{thth}^{-1}(k)(Z_{thv}(k)\Delta v_k + f_{th}^k \xi(k+1) - \Delta H_{th}^k)$ (Eq. 51)

and $\Delta v_k = (v_k)_{new} - (v_k)_{Old}$ (Eq. 52)

where $(v_k)_{new}$ is calculated by applying the adapted manipulating variable $th_{k-1}$ on the system equation.

5. Repeat steps 1 through 4 until the number of desired iterations or the desired accuracy is achieved.

Implementation of the Cost Minimizing Algorithm

For an area around the current vehicle positioned ("Prediction Horizon"), the optimal velocity, throttle pedal positions, and controller gain series are stored in a look-up table (which is contained in a ring buffer memory, as discussed hereinafter). The resolution of this look-up table is thereby the Integration Step Size h. (The optimal velocity is considered to be constant for small distances h.) The output values of the PCC system are then determined by reading out the values corresponding to the estimated vehicle position.

The look-up table values are calculated online, in real time as the vehicle proceeds along the traveled route. Such online, real time calculation adapts the look-up table during the drive by taking the current vehicle velocity into account. The advantages of such a system (compared to an offline version in which the stored values are determined in advance and are invariable) are:

Less memory is needed.

An online determination gives the opportunity to change the route while driving.

There is no need for a previous "record drive" by an expert driver, and the system can be used on any route, the first time it is traveled.

When vehicle velocity drifts significantly from the velocity stored in the look-up table for the current position (as might be caused, for example, by a slower vehicle driving ahead), the velocity values for the following positions in the look-up table then can no longer be considered to be optimal. In this case an online version of the algorithm can adapt these values by taking the current velocity into account.

An on-line version has the advantage of being able to adapt the optimal trajectories to variable vehicle parameters, such as vehicle mass, which has a significant impact on the dynamics of the vehicle.

It is therefore important to implement the optimization algorithm in a manner which permits online adaptation of the look-up table. While the optimization calculation could be performed for every computational cycle given enough computing power, this approach was not used in the current implementation. Rather, a new optimization calculation only occurs once the vehicle has covered a specified distance, which is referred to hereinafter as a "frame", or when the set speed is changed. In addition, the calculation is distributed over several computational cycles to reduce the computational burden.

Figures 10, 11:
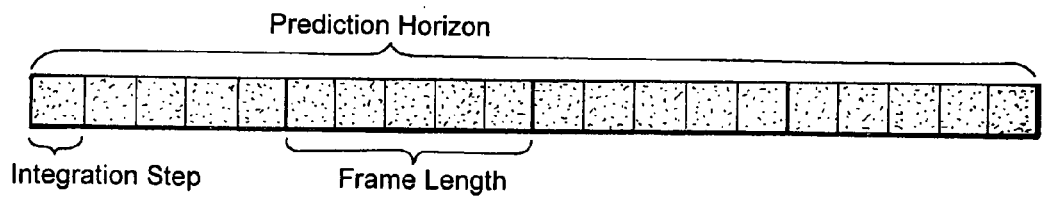
FIG. 10 shows the formatting of data for the Prediction Horizon according to the invention.
FIG. 11 illustrates the ring buffer memory used for performing the calculations according to the invention.

The whole Prediction Horizon is separated into Frames, so that the Prediction Horizon must be a multiple of the Frame Length (also measured in number of integration steps h). FIG. 10 shows this separation for a Prediction Horizon of 20, the Number Of Frames is 4, and the resulting Frame Length is 5. (This is a simplified version for illustration only.) The parameter "Number of Frames" determines the rate at which the optimal trajectory is updated.

In the PCC unit according to the invention, the values for vehicle velocity, throttle position and controller gain calculated as described previously are entered into a ring buffer memory having a capacity that corresponds to the length (in frames and integration steps) of the Prediction Horizon, together with the following variables needed for the calculation of the optimization algorithm:

the Lagrangian multiplier ν the influence variables ξ and P, the partial derivative of the Hamiltonian by the throttle pedal position $H_{th}$, the angles φ (representing the grade of the road) and the curve radii r.

FIG. 11 shows the resulting memory arrangement of the ring buffer.

Figure 12A:
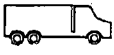
FIGS. 12a–c show the ring buffer memory status during an initialization state prior to operation of the vehicle.
Figure 12B:
Figure 12C:
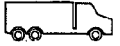
Figure 13A:
FIGS. 13a–d show the operation of the optimization algorithm during driving of the vehicle.
Figure 13B:
Figure 13C:
Figure 13D:

The sequence of the optimization algorithm will now be explained by reference to the example ring buffer of FIG. 11. FIGS. 12a–c show an initialization stage in which the whole Prediction Horizon (except for the last frame) is calculated, while FIGS. 13a–c illustrate the operation of the ring buffer while the vehicle is driving.

The initialization of the ring buffer (FIG. 12a–c) must be completed before the vehicle reaches the start point on the road where the PCC system is triggered. Two stages of the initialization can be distinguished:

1. First, the ring buffer memory is filled with angle and radius values from cell zero up to the last cell of the next to last frame. (FIG. 12a.) (For example, the value $φ_k$ is the grade of the road at the position specified by the driven distance since the start point $S_k$=k·h (where again h is the Integration Step Size), as read from the road map (FIG. 6). While filling these ring buffer cells, also starting values are estimated for the velocity trajectory, and the appropriate throttle pedal positions are computed, as illustrated in FIG. 12b.

2. In the second step several optimization iterations are applied on the memory range described above until the algorithm has converged and thus the values are optimal, as shown in FIG. 12c.

The white background of the velocity memory cells in FIG. 12b indicates that these values are starting estimates obtained by applying a conventional cruise controller, and thus are not optimal. The dark background in FIG. 12.c indicates that the velocity values are optimal.

Figure 14:
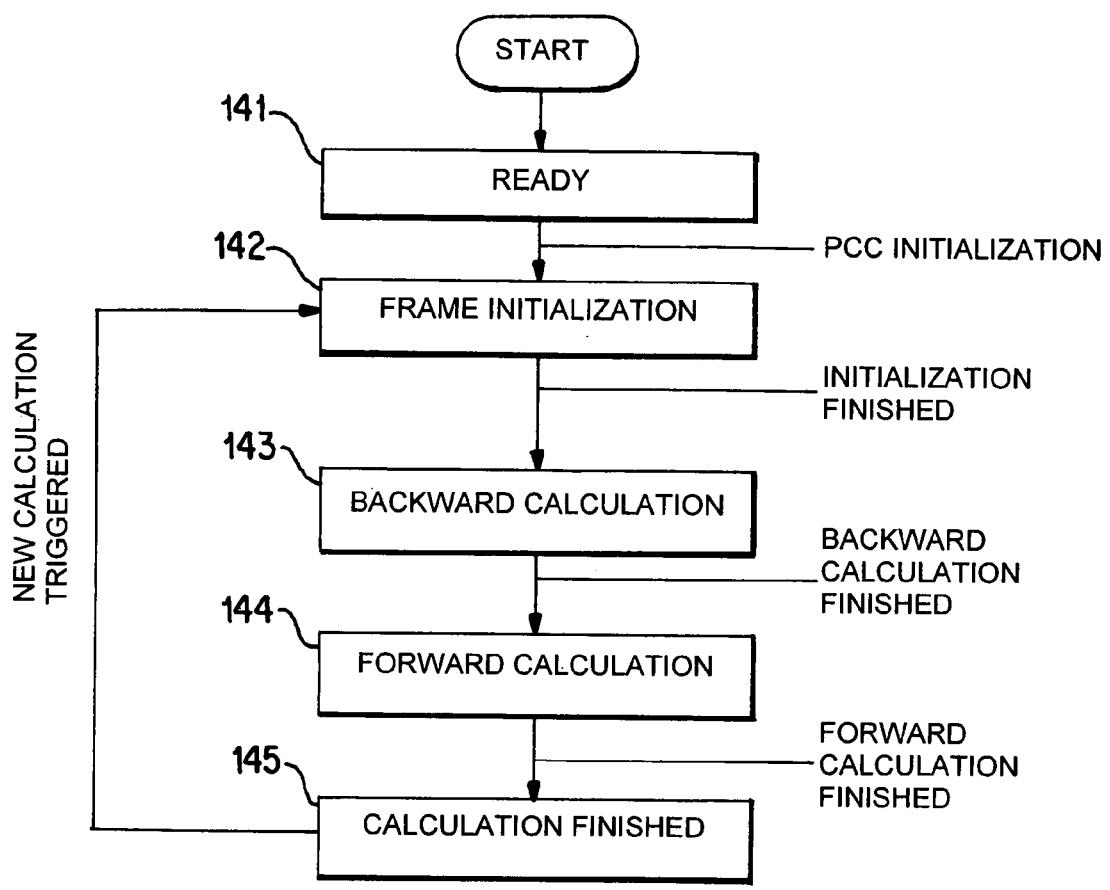
FIG. 14 is a flow chart that illustrates the operation of the optimization algorithm according to the invention.

Operation of the Optimization Algorithm module has five different states, as shown in FIG. 14. They are as follows:

READY (Step 141): The module remains in this state until the initial calculation is started.

FRAME_INITIALIZATION (Step 142): A frame is filled with road data and estimated starting values of v and th are made for this frame.

BACKWARD_CALCULATION (Step 143): For a specified range in the ring buffer the series of λ, P, ξ and $H_{th}$ are calculated simultaneously (as described previously) and stored in the respective ring buffer cells.

FORWARD_CALCULATION (Step 144): The velocity, throttle and controller gain values are adapted, according to step 4 of the algorithm.

CALCULATION_FINISHED (Step 145): If all calculations are completed before the vehicle reaches the end of the current frame, then the algorithm module remains in this state until a new calculation is triggered.

After the vehicle has passed the start point, the output values for the respective vehicle positions are read out of the first frame. Meanwhile, no further calculations are done. When the vehicle reaches the end of the first frame a new calculation is triggered:

1. The start and final index of the current frame for which initialization is to take place, and the start and final index of the ring buffer range for which optimization iteration is to take place are fixed. The calculation is started by setting the calculation state to FRAME_INITIALIZATION. In the example in FIG. 13, the bounding indices for the frame initialization are the first and the last indices of frame no. 3. The starting value for the velocity and throttle start estimations is the velocity value stored in the last index of frame no. 2 (FIG. 13.a).

2. When the frame initialization is finished, the calculation state switches to BACKWARD_CALCULATION and afterwards to FORWARD_CALCULATION, and thus a whole optimization iteration is applied on the specified range in the ring buffer (FIG. 13.b). The current vehicle velocity is used as start velocity in order to take the actual vehicle state into account. In FIG. 13.b, the light gray background of the velocity memory cells of frame no. 3 indicate that these values are "more optimal" than the start estimations since one optimization iteration step is applied on them. All these calculations are done while the vehicle is driving in the first frame. The output values of the PCC system (FIG. 6) are read out of the first frame, which constitutes the "look-up table" for this purpose. The calculations must be finished when the vehicle reaches the end of frame 1; otherwise the synchronization of the optimization algorithm and vehicle movement fails. If this happens, the PCC system will stop all computations and switch to failure mode.

3. FIGS. 13.c and d show the state of the ring buffer when the vehicle is driving in frame 2. This time frame no. 0 is filled with road data and starting value estimates (FIG. 13.c), and an optimization iteration is applied on frames 2, 3, and 0 (FIG. 13.d). The background color of the velocity cells of frame 3 are now darker than in the previous step, denoting that now two optimization iterations have been performed for this memory range, and so these values approach closer to the optimal values.

In the example of FIGS. 12 and 13, the parameters Prediction Horizon and Number of Frames are chosen very small in order to make the basic operation of the ring buffer clear. Realistic values for the Prediction Horizon would be 4000 assuming an Integration Step Size of 1 m, and 200 for the Number of Frames. Thus, nearly 200 optimization iteration steps are performed with regard to the values in one frame before they are actually read out. This number is more than enough for the algorithm to converge to the optimal values. Therefore, it is sufficient to compute one optimization per frame.

Figure 15:
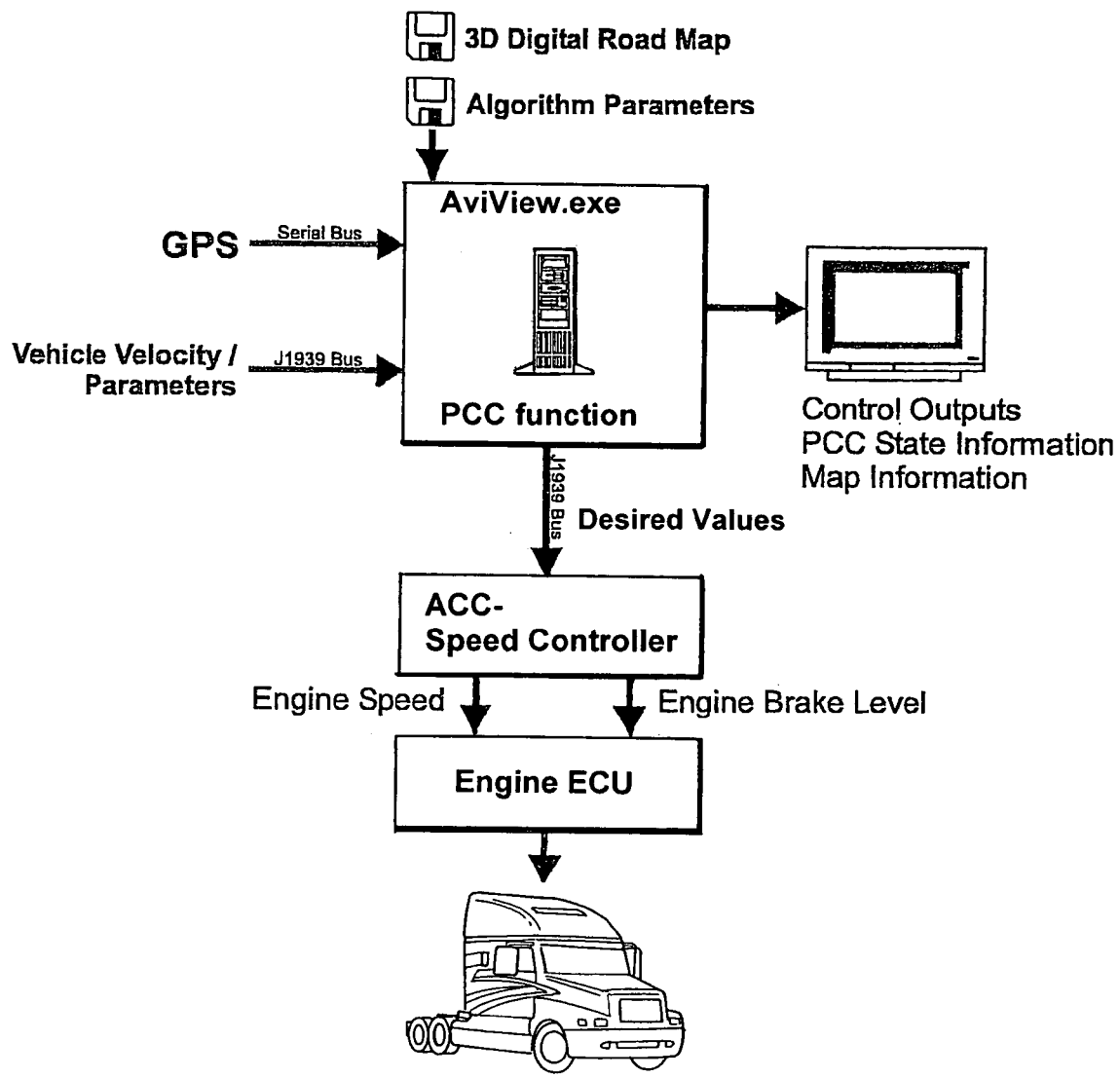
FIG. 15 shows an implementation of the PCC system according to the invention in a vehicle.

FIG. 15 shows the PCC system implemented in a vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling operation of a vehicle, comprising:
   defining an analytic vehicle operating cost function based on a plurality of environmental parameters, vehicle parameters, vehicle operating parameters and route parameters;
   sensing said environmental and vehicle operating parameters as the vehicle travels a route for which route parameters are stored in a road map, said vehicle operating parameters including at least vehicle speed and vehicle position relative to said road map;
   as the vehicle travels said route, iteratively calculating and storing in a memory, vehicle control parameters that minimize said vehicle operating cost function for a predetermined distance along said route ahead of said vehicle, as a function of at least vehicle speed, vehicle position and route parameters stored in said road map;
   reading from said memory optimized vehicle control parameters corresponding to a current position of said vehicle; and
   controlling current vehicle operation based on said optimized vehicle control parameters.

2. The method according to claim 1, wherein said route parameters include at least road gradient and radius of curvature.

3. The method according to claim 1, wherein:
   said vehicle has an adaptive cruise control system;
   said vehicle control parameters include at least a desired vehicle speed; and
   said vehicle control parameters are input to said adaptive cruise control system for controlling vehicle operation.

4. The method according to claim 1, wherein said vehicle position is determined based on input signals from a GPS system, vehicle speed and route data stored in said road map.

5. The method according to claim 1 wherein said vehicle operating cost function is based on a mathematical model of vehicle dynamics for said vehicle travelling on a road.

6. The method according to claim 5, wherein said mathematical model is based on the relationship $$m \cdot \frac{dv}{dt} = \sum_i Fi$$

wherein m is the mass of the vehicle, v is its velocity and Fi are longitudinal forces affecting vehicle operation.

7. The method according to claim 6, wherein Fi comprises at least forces exerted by the vehicle engine, vehicle brakes, and drag, and forces exerted by road gradient and friction.

8. The method according to claim 1, wherein said cost function comprises a desired vehicle speed range and imposes a cost penalty based on an extent to which the vehicle speed exceeds an upper or lower limit of said speed range.

9. The method according to claim 5, wherein said cost function comprises a desired vehicle speed range and imposes a cost penalty based on an extent to which the vehicle speed exceeds an upper or lower limit of said speed range.

10. The method according to claim 1, wherein said cost function includes vehicle fuel consumption as a function of vehicle speed, road gradient and throttle position.

11. The method according to claim 5, wherein said cost function includes vehicle fuel consumption as a function of vehicle speed, road gradient and throttle position.

12. The method according to claim 1, wherein the cost function J is defined by $$J = \frac{1}{2}M(v_n - v_{desired})^2 + \underbrace{\sum_{k=0}^{N-1}\left\{hT\frac{1}{v_k} + \frac{1}{2}hS\phi v_k th_k^2 + \frac{1}{2}qh(v_k - v_{desired})^2 + \frac{1}{2}\cdot h\cdot R\sum_{k=0}^{N-1}(v_k^2\cdot c_k - g\cdot\Theta_k - a_{max})^2\cdot\sigma(v_k^2\cdot c_k - g\cdot\Theta_k - a_{max}) + \frac{1}{2}\Gamma_1(v_{lower} - v_k)^2\sigma(v_{lower} - v_k) + \Gamma_2(v_k - v_{upper})^2\sigma(v_k - v_{upper})\right\}}_{=:L}$$

wherein v is vehicle velocity;
   th is a throttle percentage value;
   φ is road gradient;
   r is road radius of curvature;
   k is an index value;
   N is the index value at the end of the prediction horizon;
   h is an iteration interval;
   σ, is a parameter whose value is 1 if the value of the quantity within the parentheses following σ is $\geq 0$, and is 0 if the value of such quantity is $\leq 0$;
   $V_{upper}$ is an upper limit of a speed range;
   $V_{lower}$ is a lower limit of a speed range;
   $V_{des}$ is a desired vehicle speed; and
   M, T, S, $\Gamma_{1/2}$, q and R are constant values.

13. The method according to claim 1, wherein:
   said operating cost function provides an analytic calculation of vehicle operating cost based on said parameters; and
   parameters which minimize said analytically calculated vehicle operating cost for said predetermined distance are stored in said memory.

14. Apparatus for controlling operation of a vehicle, comprising:

sensors for sensing vehicle operating parameters, including at least vehicle speed and position; and a predictive cruise control module which determines optimum vehicle control parameters that minimize vehicle operating costs defined by an analytic vehicle operating cost function based on said vehicle operating parameters and environmental, vehicle and route parameters and supplies said optimum vehicle control parameters to a vehicle controller that controls at least an engine operating parameter of said vehicle as a function thereof;

wherein said vehicle control parameters comprise at least a desired vehicle speed, for operation of said controller.

15. The apparatus according to claim 14, wherein said predictive cruise control module comprises:

a first memory having stored therein a road map including route parameters that characterize routes within a vehicle operating area;

a data processor programmed to calculate said optimum vehicle control parameters, based on said cost function, said vehicle operating parameters, said route parameters and an optimization algorithm stored therein; and a second memory for storing a lookup table containing optimizing vehicle control parameters calculated by said data processor for a prediction horizon extending a predetermined distance ahead of said vehicle along a traveled route, said lookup table being accessible as a function of an estimated position of said vehicle.

16. The apparatus according to claim 14, wherein said route parameters include at least road gradient and radius of curvature.

17. The apparatus according to claim 15, wherein said second memory comprises a ring buffer memory for storing iteratively calculated values of said vehicle control parameters, said ring buffer memory having a capacity to store information for a plurality of integration intervals included in said prediction horizon.

18. The apparatus according to claim 17, wherein:

said ring buffer memory is divided into a plurality of frames which collectively correspond to said prediction horizon, each frame including a predetermined number of cells corresponding to said integration interval; and said processor commences a new iteration of said optimization algorithm in synchronism with a beginning of each frame.

19. The apparatus according to claim 15, wherein said position estimator unit determines said vehicle position based on input signals from a GPS system, and vehicle speed and route parameters stored in said road map.

20. The apparatus according to claim 19, wherein said vehicle operating cost function is based on a mathematical model of vehicle dynamics for a vehicle travelling on a road.

21. The apparatus according to claim 20, wherein said mathematical model is based on the relationship $$m \cdot \frac{dv}{dt} = \sum_i Fi$$

wherein m is the mass of the vehicle, v is its velocity and Fi are longitudinal forces affecting vehicle operation.

22. The apparatus according to claim 21, wherein Fi comprises at least forces exerted by the vehicle engine, vehicle brakes and drag, and forces exerted by road gradient and friction.

23. The apparatus according to claim 20, wherein said cost function comprises a desired vehicle speed range and imposes a cost penalty based on an extent to which the vehicle speed exceeds an upper limit or a lower limit of said speed range.

24. The apparatus according to claim 20, wherein said cost function includes vehicle fuel consumption as a function of vehicle speed, road gradient and throttle position.

25. The apparatus according to claim 14, wherein the cost function J is defined by $$J = \frac{1}{2}M(v_n - v_{desired})^2 +$$

$$\sum_{k=0}^{N-1}\left\{hT\frac{1}{v_k} + \frac{1}{2}hS\phi v_k th_k^2 + \frac{1}{2}qh(v_k - v_{desired})^2 + \right.$$

$$\frac{1}{2} \cdot h \cdot R \sum_{k=0}^{N-1}(v_k^2 \cdot c_k - g \cdot \Theta_k - a_{max})^2 \cdot \sigma(v_k^2 \cdot c_k - g \cdot \Theta_k - a_{max}) +$$

$$\underbrace{\left.\frac{1}{2}\Gamma_1(v_{lower} - v_k)^2\sigma(v_{lower} - v_k) + \Gamma_2(v_k - v_{upper})^2\sigma(v_k - v_{upper})\right\}}_{=:L}$$

wherein v is vehicle velocity;

th is a throttle percentage value;

$\phi$ is road gradient;

r is road radius of curvature;

k is an index value;

N is the index value at the end of the prediction horizon;

h is an iteration interval;

σ is a parameter whose value is 1 if the value of the quantity within the parentheses following σ is $\geq 0$, and is 0 if the value of such quantity is $\leq 0$;

$V_{upper}$ is an upper limit of a speed range;

$V_{lower}$ is a lower limit of a speed range;

$V_{des}$ is a desired vehicle speed; and

M, T, S, $\Gamma_{1/2}$, q and R are constant values.

26. The apparatus according to claim 14, wherein:

said operating cost function provides an analytic calculation of vehicle operating cost based on said parameters; and parameters which minimize said analytically calculated vehicle operating cost for said predetermined distance are stored in said memory.

27. For a vehicle having an adaptive cruise control module that controls at least a throttle position of said vehicle as a function of vehicle control parameters, and sensors for sensing vehicle operating parameters including at least vehicle speed and position, apparatus comprising:

a predictive cruise control module which iteratively determines and updates optimum vehicle control parameters that minimize vehicle operating costs defined by an analytic vehicle operating cost function, based on said vehicle operating parameters and environmental, vehicle and route parameters;

wherein said vehicle control parameters comprise a desired vehicle speed, a desired vehicle throttle position and a controller gain value, which vehicle control parameters are input to said adaptive cruise controller for controlling at least said throttle position of said vehicle.

28. The apparatus according to claim 27, wherein said predictive cruise control module comprises:
a position estimator unit;
a first memory having stored therein a road map including route parameters that characterize routes within a vehicle operating area;
a data processor programmed to calculate said optimizing vehicle control parameters, based on said cost function, said vehicle operating parameters, said route parameters and an optimization algorithm stored therein; and
a second memory for storing a lookup table containing optimizing vehicle control parameters calculated by said data processor for a prediction horizon extending a predetermined distance ahead of said vehicle along a traveled route, said lookup table being accessible as a function of position of said vehicle determined by said position estimator unit.

29. The apparatus according to claim 27, wherein said route parameters include at least road gradient at radius of curvature.

30. The apparatus according to claim 28, wherein said second memory comprises a ring buffer memory for storing and continuously updating iteratively calculated values of said vehicle control parameters, said ring buffer memory having a capacity to store information for a plurality of integration intervals included in said prediction horizon.

31. The apparatus according to claim 30, wherein:
said ring buffer memory is divided into a plurality of frames which collectively correspond to said prediction horizon, each frame including a predetermined number of cells corresponding to said integration interval; and
said processor commences a new iteration of said optimization algorithm in synchronism with the beginning of each frame, or when said set speed changes.

32. The apparatus according to claim 28, wherein said position estimator unit determines said vehicle position based on input signals from a GPS system, vehicle speed and route parameters stored in said road map.

33. The apparatus according to claim 32, wherein said vehicle operating cost function is based on a mathematical model of vehicle dynamics for a vehicle travelling on a road.

34. The apparatus according to claim 33, wherein said mathematical model is based on the relationship $$m \cdot \frac{dv}{dt} = \sum_i Fi$$

wherein m is the mass of the vehicle, v is its velocity and Fi are longitudinal forces affecting vehicle operation.

35. The apparatus according to claim 34, wherein Fi comprises at least forces exerted by the vehicle engine, brakes and drag, and forces exerted by road gradient and friction.

36. The apparatus according to claim 33, wherein said cost function comprises a desired vehicle speed range and imposes a cost penalty based on an extent to which vehicle speed exceeds an upper or lower limit of said speed range.

37. The apparatus according to claim 33, wherein said cost function includes vehicle fuel consumption as a function of vehicle speed, road gradient and throttle position.

38. The apparatus according to claim 27, wherein the cost function J is defined by $$J = \frac{1}{2} M (v_n - v_{desired})^2 +$$
$$\sum_{k=0}^{N-1} \left\{ hT \frac{1}{v_k} + \frac{1}{2} hS\phi v_k th_k^2 + \frac{1}{2} qh(v_k - v_{desired})^2 + \right.$$
$$\frac{1}{2} \cdot h \cdot R \sum_{k=0}^{N-1} (v_k^2 \cdot c_k - g \cdot \Theta_k - a_{\max})^2 \cdot \sigma(v_k^2 \cdot c_k - g \cdot \Theta_k - a_{\max}) +$$
$$\underbrace{\left. \frac{1}{2} \Gamma_1 (v_{lower} - v_k)^2 \sigma(v_{lower} - v_k) + \Gamma_2 (v_k - v_{upper})^2 \sigma(v_k - v_{upper}) \right\}}_{=:L}$$

wherein v is vehicle velocity;
th is a throttle percentage value;
φ is road gradient;
r is road radius of curvature;
k is an index value;
N is the index value at the end of the prediction horizon;
h is an iteration interval;
σ is a parameter whose value is 1 if the value of the quantity within the parentheses following σ is ≧0, and is 0 if the value of such quantity is ≦0;
$V_{upper}$ is an upper limit of a speed range;
$V_{lower}$ is a lower limit of a speed range;
$V_{des}$ is a desired vehicle speed; and
M, T, S, $\Gamma_{1/2}$, q and R are constant values.

39. The apparatus according to claim 27, wherein:
said operating cost function provides an analytic calculation of vehicle operating cost based on said parameters; and
parameters which minimize said analytically calculated vehicle operating cost for said predetermined distance are stored in said memory.

* * * * *